United States Patent [19]

Lichtenberg

[11] Patent Number: 4,594,955
[45] Date of Patent: Jun. 17, 1986

[54] HEMMING MACHINE WITH FUSING TYPE SLITTER

[76] Inventor: Richard Lichtenberg, 10 Polly Dr., Huntington, N.Y. 11743

[21] Appl. No.: 772,921

[22] Filed: Sep. 5, 1985

[51] Int. Cl.⁴ .................. D05B 9/00; D05B 35/02; D05B 37/02

[52] U.S. Cl. ................... 112/147; 112/121.29; 112/129; 112/304; 83/433; 83/435; 83/701; 228/1.1

[58] Field of Search ............ 112/304, 147, 121.29, 112/129, 141, 142, 122; 226/113; 83/435, 433, 701, 914, 926; 156/510; 228/1.1

[56] References Cited

U.S. PATENT DOCUMENTS

| | | | |
|---|---|---|---|
| 3,640,235 | 2/1972 | Burton | 112/147 X |
| 3,764,442 | 10/1973 | Parry | 228/1.1 X |
| 3,817,802 | 6/1974 | Meyer | 112/129 X |
| 3,852,144 | 12/1974 | Parry | 83/926 H X |
| 3,970,509 | 7/1976 | Vitale | 228/1.1 X |
| 4,120,221 | 10/1978 | Speich | 83/433 |
| 4,343,421 | 8/1982 | Assmann et al. | 226/113 |
| 4,413,575 | 11/1983 | Gazzarrini | 112/129 |
| 4,530,295 | 7/1985 | Adamski et al. | 112/121.29 X |

*Primary Examiner*—Henry S. Jaudon
*Assistant Examiner*—Andrew M. Falik
*Attorney, Agent, or Firm*—McAulay, Fields, Fisher, Goldstein & Nissen

[57] ABSTRACT

A hemming machine has a first station with an ultrasonic slitting device for cutting woven material that has enough thermoplastic content to be cut and fused by an ultrasonic device. At a second station, a hemming device folds and sews the material and by providing only two folds, results in a three layer hem which does not fray because the edge has been fused by the ultrasonic slitting device.

7 Claims, 5 Drawing Figures

HEMMING MACHINE WITH FUSING TYPE SLITTER

BACKGROUND OF THE INVENTION

This invention relates in general to a hemming machine, and more particularly to a hemming machine for hemming material which has sufficient thermoplastic content to cut and fuse when exposed to the heat generated by an ultrasonic slitting device.

The hemming of material is an important step in the manufacture of various textile items. With particular reference to the curtain and drape field, it is important to create clean, even, and relatively non-bulky hems.

It is known in the art to use an automatic hemming machine of the type sold by Spear Systems, Inc. of Campbellsville, Ky., to fold and sew curtain and drape material thus creating hems thereon. The automatic hemming machines can be used to form either one hem or to simultaneously form two hems on the curtain. The automatic hemming machines fold the material for hemming twice so that there are only three layers of material at the hem edge.

Woven goods, when cut in preparation of hemming same, have an uneven, frayed edge. To prevent further fraying of this cut edge, it is necessary to fold the material three times creating a four layer hem edge. If this is not done the material itself may unravel and hence not wear well. Further, the loose bits of material from the frayed edge scatter and thus litter.

Since automatic hemming and sewing machines do not fold three times to create a four layer hem edge, they have not been used with woven material. Instead, when woven material is made into curtains and drapes, the folding and sewing is done by hand. This is a time consuming procedure, which is labor intensive, resulting in a non-economical production method.

Accordingly, it is a major purpose of this invention to provide a hemming machine which permits the use of an automatic folding and sewing device with woven material.

Yet another object of this invention is to provide such a machine which is usable to create a neat, even, and non-bulky hem having a smooth unfrayed edge.

Yet a further object of the present invention is to provide a hemming machine which will permit the economical manufacture of curtains and drapes made of woven material.

SUMMARY OF THE INVENTION

In brief, one embodiment of this invention involves a hemming machine usable to hem material which has sufficient thermoplastic content to cut and fuse when exposed to the heat generated by an ultrasonic device. The hemming machine includes a first station with at least one ultrasonic slitting machine. The ultrasonic slitting machine simultaneously cuts and fuses the edges of material fed therethrough. The hemming machine includes a second station with at least one hemming device for automatically folding and sewing the material edges to form a hem thereon. A feeding means feeds and synchronizes the flow of material from the first station to the second station. The second station is positioned downstream from the first station.

The hemming machine of the present invention permits the use of an automatic folding and sewing device with woven material. The folding device, folds the material twice to provide a hem having only three layers thereon. The edge of the woven material does not fray because it has been fused by the ultrasonic slitting device.

DESCRIPTION OF THE PREFERRED EMBODIMENTS

Figure 1:
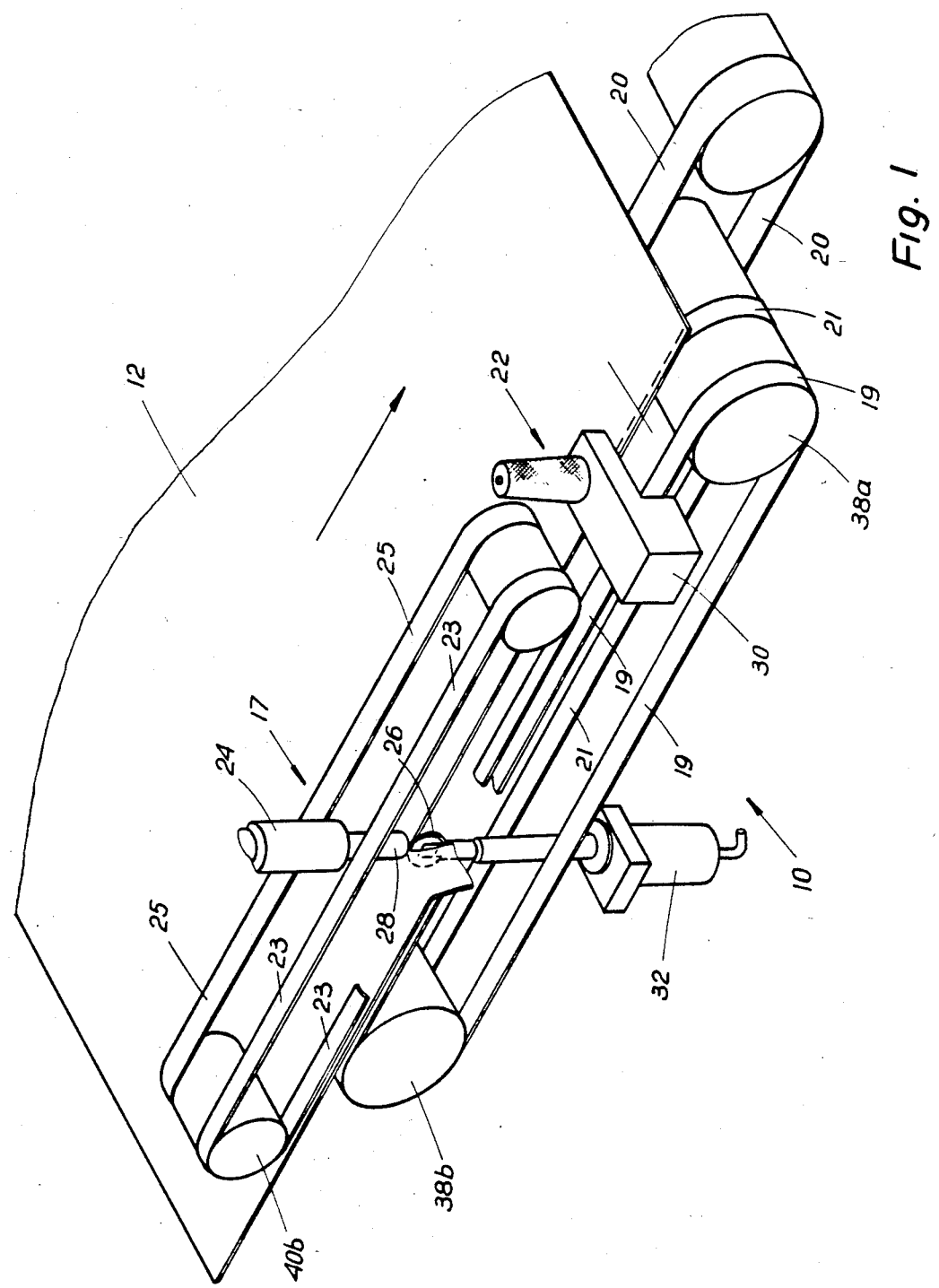
FIG. 1 is a perspective view of a portion of the hemming machine of the present invention showing material travelling from the first station thereof at which the material is slit and fused downstream to the second station where the hem is folded and sewn.
Figure 2:
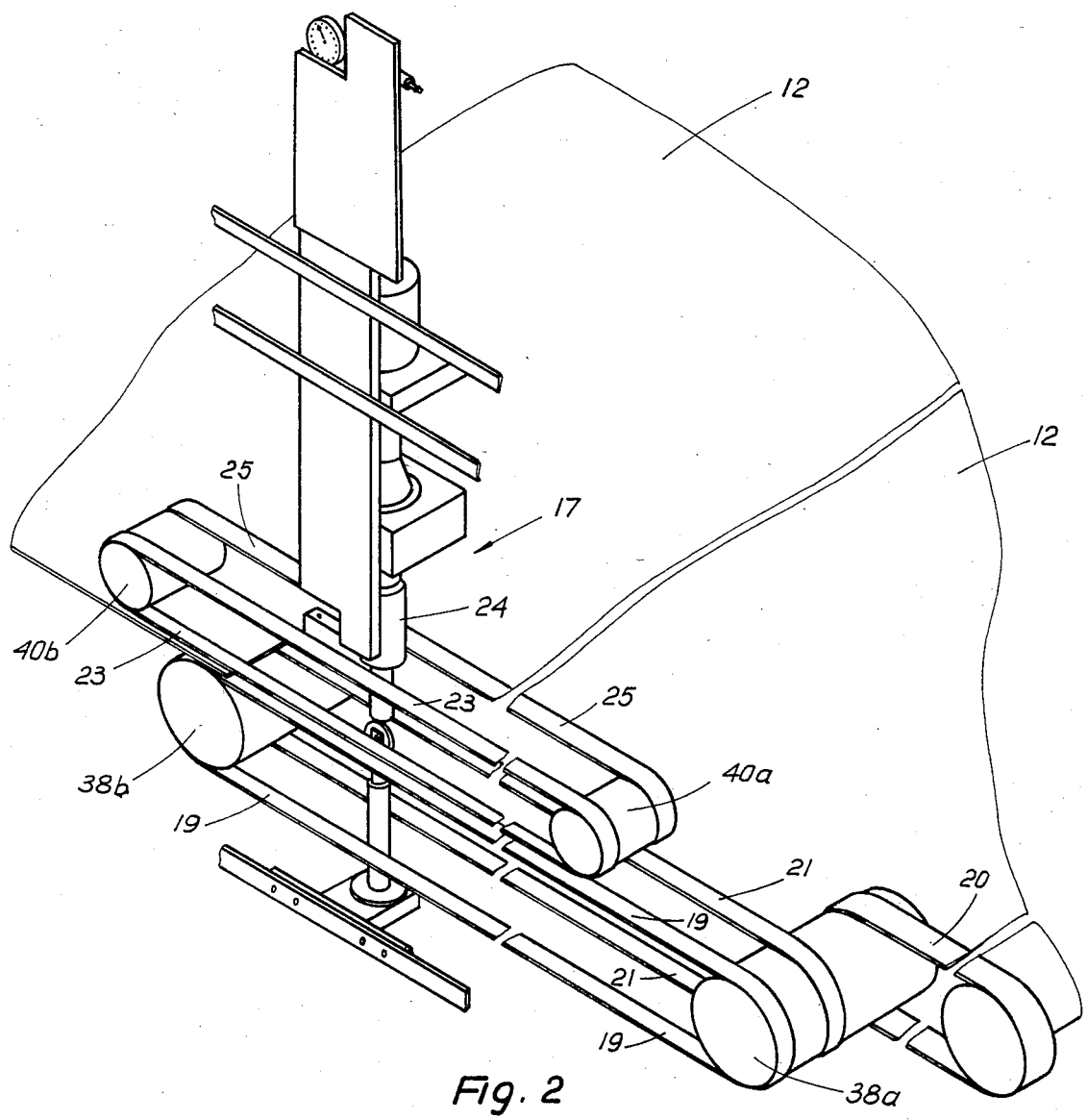
FIG. 2 is a perspective view of the slitting and fusing device used at the first station of the FIG. 1 hemming machine of the present invention.

Referring now to the drawings, the reference numeral 10 denotes the hemming machine of the present invention. Hemming machine 10 is usable for forming either a single hem or two hems simultaneously on a piece of textile material 12. The textile material 12 must have sufficient thermoplastic content to cut and fuse when exposed to the heat generated by an ultrasonic slitting device. Although hemming machine 10 can be used on any type of material, for the purpose of this invention it is intended for use with a woven material.

The material 12 to be hemmed, travels longitudinally along a conveyer table (not shown) on a series of spaced apart lower conveyer belts 20. As best seen in FIG. 1, the material moves downstream in the direction indicated by the arrow, from a first station 17 to a second station 22.

Figure 3:
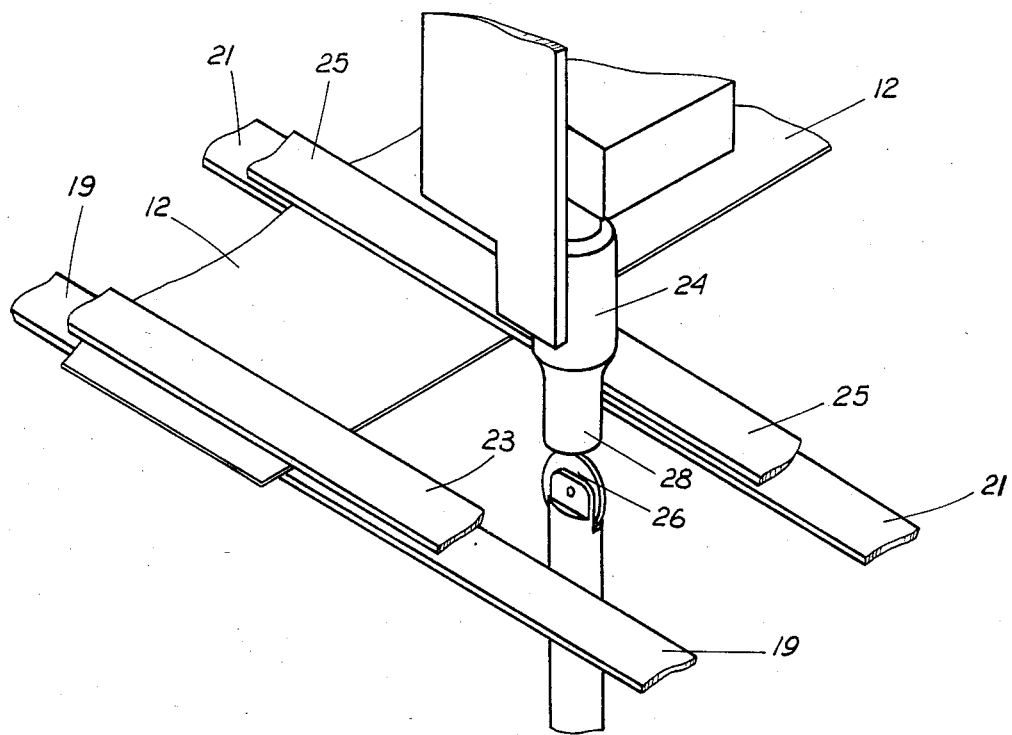
FIG. 3 is a perspective view showing the anvil and horn of the FIG. 2 slitting device.
Figure 4:
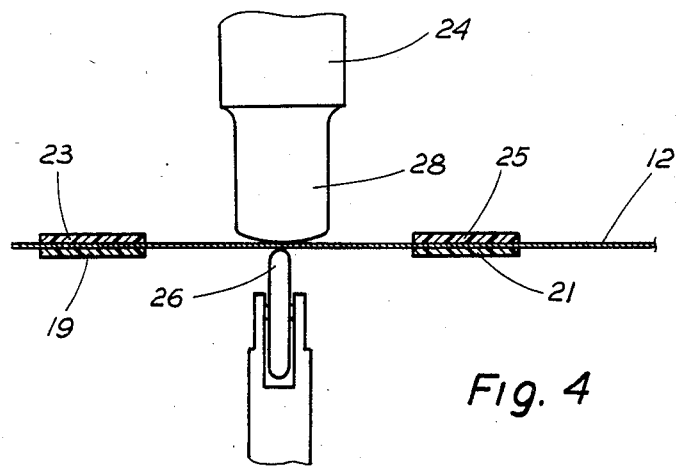
FIG. 4 is an elevation view of the anvil and horn of the FIG. 2 slitting device showing the woven material passing therebetween.

At the first station 17 is an ultrasonic slitting device 24. Laterally spaced therefrom at the opposite side edge of the conveyer table 18 is a second ultrasonic slitting device (not shown). In one embodiment of the invention, the ultrasonic slitting devices 24 are Branson Ultrasonic Slitters, Model F-10 available from Branson Sonic Power Company of Danbury, Conn. The ultrasonic slitting devices 24 can continuously cut and fuse material having a thermoplastic content of at least 60%. As best seen in FIGS. 3 and 4, each ultrasonic slitting device includes an anvil 26 and a horn 28 such that frictional heat generated by the horn melts the material as it travels over the anvil. An air cylinder 32 provides pressure to hold the anvil 26 against horn 28. Thus, cut-off strip may be removed either mechanically or by a vacuum means (not shown).

At the second station 22 is a first folding and hemming device 30. A second folding and hemming device (not shown) is laterally spaced from the first such device 30 at the other side of table 18. In one embodiment of the present invention the folding and hemming devices 30 are Spear Model 1042 Double Sewing Head Hemmers available from Spear Systems, Inc. of Campbellsville, Ky. These folding and hemming devices 30 fold the material edges twice to create a hem having only three layers of material.

Thus, after the material edges are cut and fused at the station 17, the clean, non-frayed material 12 proceeds downstream to station 22 where it is folded and sewn to create a drape or curtain having neat, even, non-bulky hems without frayed edges.

A pair of laterally spaced apart and laterally aligned lower conveyer belts 19 and 21 are provided to work in conjunction with a pair of laterally spaced apart and laterally aligned upper conveyer belts 23 and 25. Lower conveyer belt 19 is vertically aligned with upper conveyer belt 23. Lower conveyer belt 21 is vertically aligned with upper conveyer belt 25. The slitting device 24 extends between lower belts 19 and 21 and also between upper belts 23 and 25. Thus upper belt 23 and lower belt 19 together hold the material 12 securely in position prior to the cutting and fusing of its edges, while upper belt 25 and lower belt 21 together hold the material 12 in position both before and after its edges are cut and fused.

Figure 5:
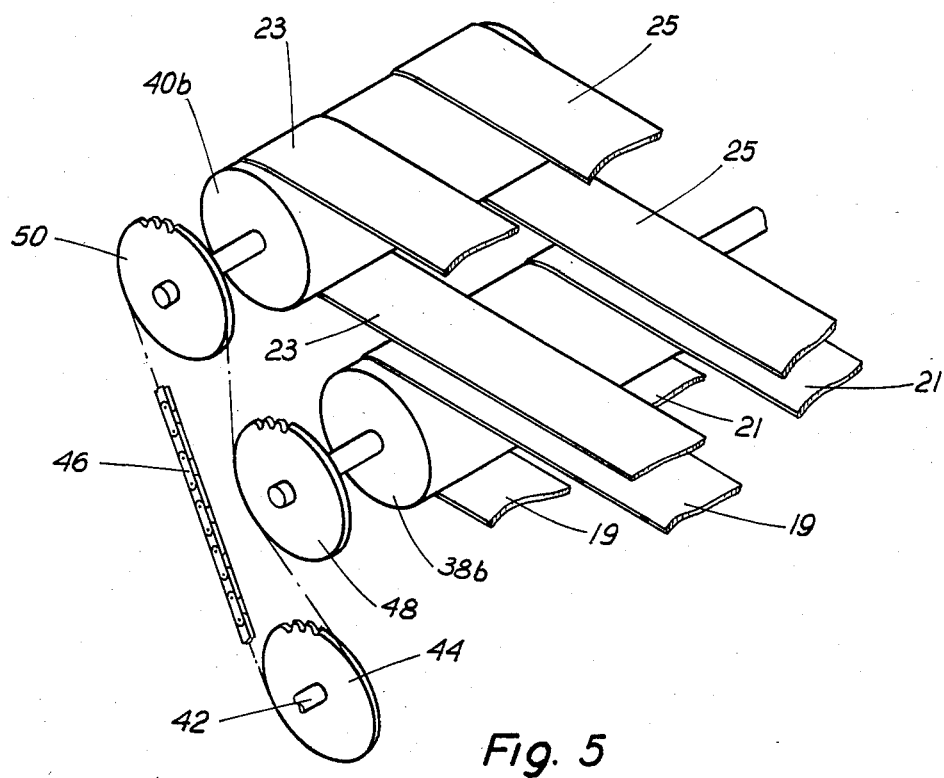
FIG. 5 is a perspective view showing the synchronization system of the FIG. 1 hemming machine.

FIG. 5 shows the gearing connection which synchronizes the powering of the shafts on which the conveyer belts 19, 21, 23 and 25 ride. This synchronizing occurs by means of a drive shaft 42 which drives toothed gear 44 that in turn drives a chain 46 from which first and second toothed gears 48 and 50 are driven. These gears 48 and 50 are mounted on the shaft that drives the rollers 38b and 40b respectively so that the drive from shaft 42 is transmitted simultaneously through to the rollers 38b and 40b and both travel in a synchronous fashion. The friction drive between the roller 38b and the belts 19 and 21 is transmitted by means of friction drive to the roller 38a and hence to the other drive belts 20 on the table 18.

A second set of aligned lower and upper conveyer belts (not shown) which travel in endless loops over rollers is provided laterally spaced apart from lower and upper conveyer belts 19, 21, 23 and 25. This second set of belts controls the material 12 at the other side of the table 18.

Using the machine of the present invention one can neatly hem woven material using an automatic hemming device which folds the material only twice.

What is claimed is:

1. A hemming machine to hem material having sufficient thermoplastic content to fuse when exposed to heat generated by an ultrasonic device, said machine comprising:

first and second laterally spaced apart lower conveyer belts;

first and second laterally spaced apart upper conveyer belts;

a slitting device for simultaneously cutting and fusing the edge of material fed therethrough, said slitting device extending between said first and second lower conveyer belts and between said first and second upper conveyer belts;

said first upper belt and said first lower belt holding the material being fed between them prior to cutting and fusing by said slitting device;

said second upper belt and said second lower belt holding the material being fed between them prior to and subsequent to cutting and fusing by said slitting device;

a hemming device for automatically folding and sewing the edge of material fed therethrough to form a hem; and synchronizing means to feed and synchronize the flow of material from said slitting device to said hemming device, said hemming device being downstream from said slitting device.

2. The machine of claim 1 wherein:

said first and second lower conveyer belts are laterally aligned;

said first and second upper conveyer belts are laterally aligned;

said first lower conveyer belt and said first upper conveyer belt are vertically aligned; and said second lower conveyer belt and said second upper conveyer belt are laterally aligned.

3. The machine of claim 2 wherein:

said hemming device includes folding means for twice folding an edge of material being fed therethrough to provide a hem having only three layers of material.

4. The machine of claim 6 wherein said slitting device is an ultrasonic device capable of continuous cutting and fusing of material.

5. The machine of claim 1 wherein:

said hemming device includes folding means for twice folding an edge of material being fed therethrough to provide a hem having only three layers of material.

6. The machine of claim 5 wherein said slitting device is an ultrasonic device capable of continuous cutting and fusing of material.

7. The machine of claim 2 wherein said slitting device is an ultrasonic device capable of continuous cutting and fusing of material.

* * * * *